United States Patent
Kim et al.

(10) Patent No.: US 7,286,902 B2
(45) Date of Patent: Oct. 23, 2007

(54) METHOD AND APPARATUS FOR DETECTING POSITION OF MOBILE ROBOT

(75) Inventors: Se-Wan Kim, Seoul (KR); Sung-Il Park, Anyang (KR)

(73) Assignee: LG Electronics Inc., Seoul (KR)

( * ) Notice: Subject to any disclaimer, the term of this patent is extended or adjusted under 35 U.S.C. 154(b) by 673 days.

(21) Appl. No.: 10/742,867

(22) Filed: Dec. 23, 2003

(65) Prior Publication Data

US 2005/0021178 A1   Jan. 27, 2005

(30) Foreign Application Priority Data

Jul. 23, 2003   (KR) ...................... 10-2003-0050726

(51) Int. Cl.
   *G06F 19/00* (2006.01)
(52) U.S. Cl. .................. 700/245; 318/568.12
(58) Field of Classification Search ................ 700/245, 700/258; 318/568.12
   See application file for complete search history.

(56) References Cited

U.S. PATENT DOCUMENTS

| | | |
|---|---|---|
| 5,440,216 A | 8/1995 | Kim |
| 5,646,494 A | 7/1997 | Han |
| 6,764,373 B1 * | 7/2004 | Osawa et al. ............... 446/175 |
| 2004/0178767 A1 * | 9/2004 | Jeon et al. ................... 320/114 |

FOREIGN PATENT DOCUMENTS

| | | | |
|---|---|---|---|
| JP | 60-102580 | A | 6/1985 |
| JP | 61-223680 | A | 10/1986 |
| JP | 62-172279 | A | 7/1987 |
| JP | 04-210704 | A | 7/1992 |
| JP | 2005-43337 | A | 2/2005 |

\* cited by examiner

*Primary Examiner*—Thomas Black
*Assistant Examiner*—Marie A Weiskopf
(74) *Attorney, Agent, or Firm*—Birch, Stewart, Kolasch & Birch, LLP

(57) ABSTRACT

A method for detecting a position of mobile robot. The method includes receiving at a mobile robot an infrared signal generated from an infrared generator according to a rotation angle of the rotated infrared generator, determining an angle between the mobile robot and the infrared generator based on a specific frequency value of the received infrared signal and previously stored frequency values, receiving an ultrasonic signal oscillated from a ultrasonic signal oscillator when the infrared generator reaches a predetermined angle, calculating a distance between the mobile robot and the ultrasonic wave oscillator by multiplying a sound velocity to a time taken for receiving the ultrasonic signal by the mobile robot after being oscillated, and detecting a position of the mobile robot based on the determined angle and the calculated distance.

17 Claims, 3 Drawing Sheets

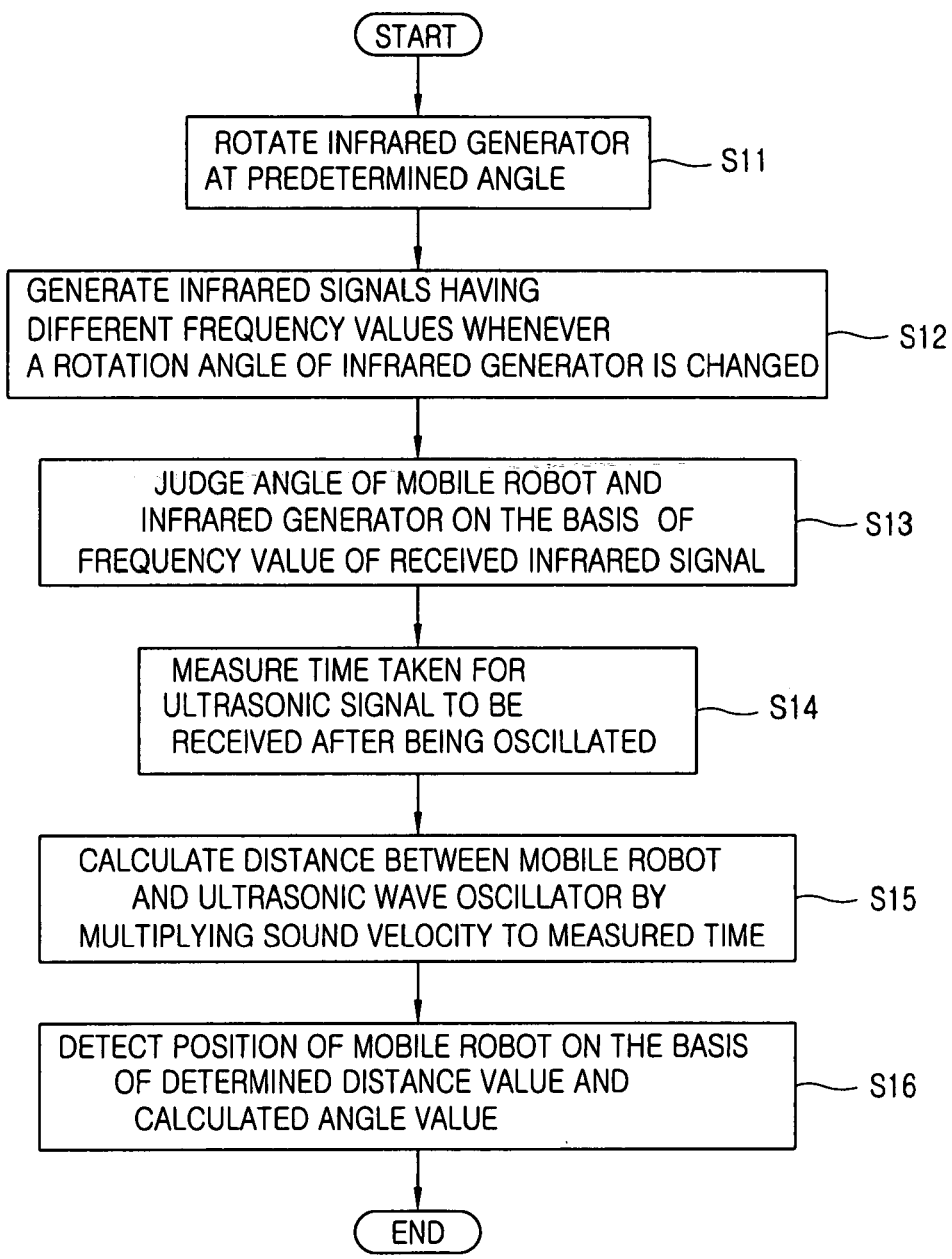

METHOD AND APPARATUS FOR DETECTING POSITION OF MOBILE ROBOT

This Nonprofitional application claims priority under 35 U.S.C. §119(a) on Patent Application No. 10-2003-0050726 filed in KOREA on Jul. 23, 2003, the entire contents of which are hereby incorporated by reference.

BACKGROUND OF THE INVENTION

1. Field of the Invention

The present invention relates to a mobile robot, and more particularly, to a method and apparatus for detecting a position of a mobile robot.

2. Description of the Background Art

In general, a mobile robot is a device for automatically cleaning an area by sucking dusts or foreign materials from the floor while moving along the wall of a room (i.e., a living room, the inner room, etc.) of a house even without manipulation of a user.

The robot cleaner discriminates a distance between itself and an obstacle such as an article of furniture, official supplies and a wall installed in a cleaning area through a distance sensor, and selectively drives a motor for driving its left wheel and a motor for driving its right wheel depending on the discriminated distance, whereby the robot cleaner cleans the cleaning area by turning its direction. Herein, the robot cleaner performs a cleaning operation by traveling the cleaning area through map information stored in an internal storing unit.

A mapping operation for generating the map information will now be described.

First, the robot cleaner calculates a distance between itself and a charging unit and its direction by moving along a side surface of an operation space (i.e., a wall side of a living of a house), and scans the operation space by judging its position on the basis of the calculated distance value and the direction value. At this time, the robot cleaner detects its current position by using an encoder installed at its own wheel.

The robot cleaner judges whether there is an obstacle between itself and the charging unit, and if there is no obstacle, it scans the operation space by transmitting to and receiving from the charging unit. If, however, there is an obstacle between the robot cleaner and the charging unit, the robot cleaner scans another operation space, and then, when the obstacle disappears, the robot cleaner scans the operation space without the obstacle while transmitting to and receiving the charging unit.

However, the method for detecting a position of the robot cleaner by using the encoder has a problem that an error occurs due to a sliding of the wheel or an idle rotation because the current position of the robot cleaner is searched by using the encoder installed at the wheel.

Meanwhile, in case of the method for detecting a position of the robot cleaner in accordance with another conventional art, several stickers or reflection plates having the same shape are attached at predetermined intervals at an operation region, so that the robot cleaner can recognize the sticker or the reflection plate by using a CCD camera and correct an error generated due to sliding or idle rotation of its wheel, thereby recognizing a distance between itself and the charging unit.

However, this method has a problem that if illumination brightness of the cleaning operation region changes or an object having a shape similar to the sticker or the reflection plate is recognized, the distance error is accumulated.

The techniques on the robot cleaner in accordance with the conventional art are also disclosed in U.S. Pat. Nos. 5,440,216 and '5,646,494.

SUMMARY OF THE INVENTION

Therefore, an object of the present invention is to provide a method and apparatus for detecting a position of a mobile robot capable of accurately and precisely detecting a position of a mobile robot, for which infrared signals having different specific frequency values according to rotational angles, an angle is determined by receiving the generated infrared signals, and a distance is calculated on the basis of a time taken for receiving a ultrasonic signal after being oscillated.

To achieve these and other advantages and in accordance with the purpose of the present invention, as embodied and broadly described herein, there is provided a method for detecting a position of a mobile robot, including: a step in which a mobile robot receives an infrared signal generated from an infrared generator according to a rotation angle of the rotated infrared generator; a step in which an angle between the mobile robot and the infrared generator is determined on the basis of the specific frequency value of the received infrared signal and previously stored frequency values; a step in which a ultrasonic signal oscillated from a ultrasonic signal oscillator is received when the infrared generator reaches a predetermined angle; a step in which a distance between the mobile robot and the ultrasonic wave oscillator is calculated by multiplying a sound velocity to a time taken for receiving the ultrasonic signal by the mobile robot after being oscillated; and a step in which a position of the mobile robot is detected on the basis of the determined angle and the calculated distance.

To achieve the above object, there is also provided an apparatus for detecting a position of a mobile robot, including: an infrared signal generator installed in a charging unit charging a battery of a mobile robot, rotated at a predetermined angle region at a predetermined rate, and generating an infrared signal whenever the rotation angle is changed; a ultrasonic wave oscillator installed in the charging unit and oscillating a ultrasonic signal when the infrared signal generator rotates and reaches a predetermined angle; and a position detector for determining an angle between the mobile robot and the infrared signal generator installed in the charging unit on the basis of a frequency value of the infrared signal radiated from the infrared signal generator and previously stored reference frequency values, and calculating a distance between the mobile robot and the ultrasonic oscillator installed in the charging by multiplying a sound velocity to the ultrasonic signal oscillated from the ultrasonic wave oscillator.

To achieve the above objects, there is also provided a charging device for charging a battery of a mobile robot including: an infrared signal generator rotating a predetermined angle region at a predetermined speed and generating infrared signals having different frequency signal values whenever the rotation angle is changed, and a ultrasonic wave oscillator for oscillating a ultrasonic signal when the infrared signal generator rotates and reaches the predetermined angle.

The mobile robot moving on the basis of previously stored map information includes an angle determining unit for comparing an specific frequency value of an infrared signal generated from the infrared generator according to a rotation angle of the rotated infrared generator and previously stored frequency values, searching a frequency value identical to the specific frequency value, and determining an angle between the mobile robot and the infrared generator by detecting an angle corresponding to the searched frequency value; and a distance calculator for calculating a distance between the mobile robot and the charging unit by multiplying a sound velocity to a difference value between the time taken for the infrared signal to be received by the mobile robot after being radiated from the infrared signal generator and the time taken for the ultrasonic signal to be received by the mobile robot after being oscillated from the ultrasonic wave oscillator.

To achieve the above object, there is also provided an apparatus for detecting a position of a mobile robot, including: a unit for receiving an infrared signal generated from an infrared generator according to a rotation angle of the rotated infrared generator; a unit for determining an angle between the mobile robot and the infrared generator on the basis of an specific frequency value of the received infrared signal and previously stored frequency values; a unit for receiving a ultrasonic signal oscillated from a ultrasonic signal oscillator when the infrared generator reaches a predetermined angle; a unit for calculating a distance between the mobile robot and the ultrasonic oscillator by multiplying a sound velocity to a time taken for the ultrasonic signal to be received by the mobile robot after being oscillated; and a unit for detecting a position of the mobile robot on the basis of the determined angle and the calculated distance.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a flow chart of a method for detecting a position of the mobile robot in accordance with the preferred embodiment of the present invention.

DETAILED DESCRIPTION OF THE PREFERRED EMBODIMENTS

Reference will now be made in detail to the preferred embodiments of the present invention, examples of which are illustrated in the accompanying drawings.

A method and apparatus for accurately and precisely detecting a position of a mobile robot by generating infrared signals having different specific frequency values depending on a rotation angle, determining an angle by receiving the generated infrared signal and calculating a distance on the basis of a time taken for an ultrasonic signal to be received after being oscillated, will now be described with reference to FIGS. 1 to 3.

Figure 1:
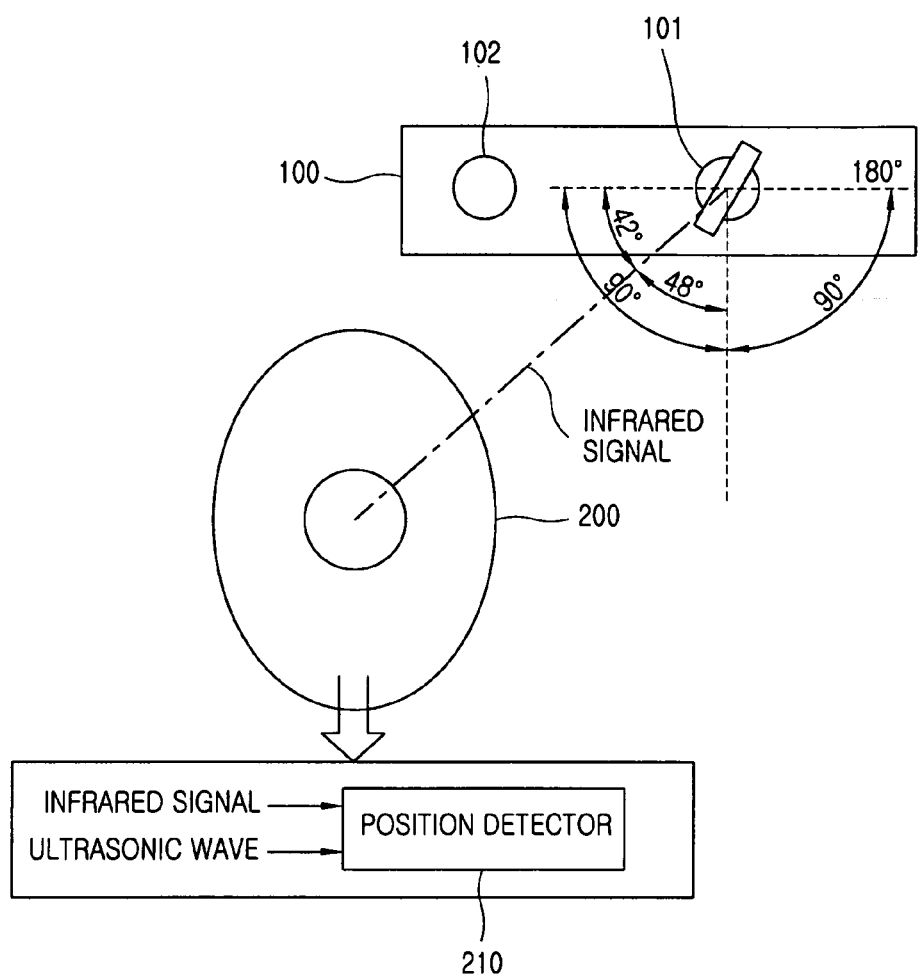
FIG. 1 is a schematic block diagram showing a construction of an apparatus for detecting a position of a mobile robot in accordance with a preferred embodiment of the present invention.

FIG. 1 is a schematic block diagram showing a construction of an apparatus for detecting a position of a mobile robot in accordance with a preferred embodiment of the present invention.

The apparatus for detecting a position of a mobile robot in accordance with the present invention can be installed in a robot cleaner or a mobile toy. That is, the present invention relates to an apparatus and method for accurately and precisely detecting a position of a robot or a toy that is movable by itself.

As shown in FIG. 1, the apparatus for detecting a position of a mobile robot in accordance with the present invention includes: an infrared signal generator 101 installed at a charging unit 100 charging a battery (not shown) of a mobile robot 200, rotated at a predetermined angle region (i.e., 180 degrees or 360 degrees) at a predetermined speed, and generating an infrared signal having a specific frequency whenever the rotation angle is changed (i.e., 1 degree); an ultrasonic wave oscillator 102 installed in the charging unit 100 and oscillating an ultrasonic signal when the infrared signal generator 101 rotates and reaches the predetermined angle (i.e., 90 degrees); and a position detector 210 for determining an angle between mobile robot 200 and the infrared signal generator 101 installed in the charging unit 100 on the basis of the infrared signal radiated from the infrared signal generator 101, and calculating a distance between the mobile robot 200 and the ultrasonic wave oscillator 102 installed in the charging unit 100 on the basis of the ultrasonic signal oscillated from the ultrasonic wave oscillator 102.

The distance and angle between the mobile robot 200 and the charging unit 100 means a position of the mobile robot 200. The infrared signal generator 101 and the ultrasonic wave oscillator 102 can be installed in various support bodies as well as in the charging unit 100.

Detailed construction of the position detector 210 will now be described with reference to FIG. 2.

Figure 2:
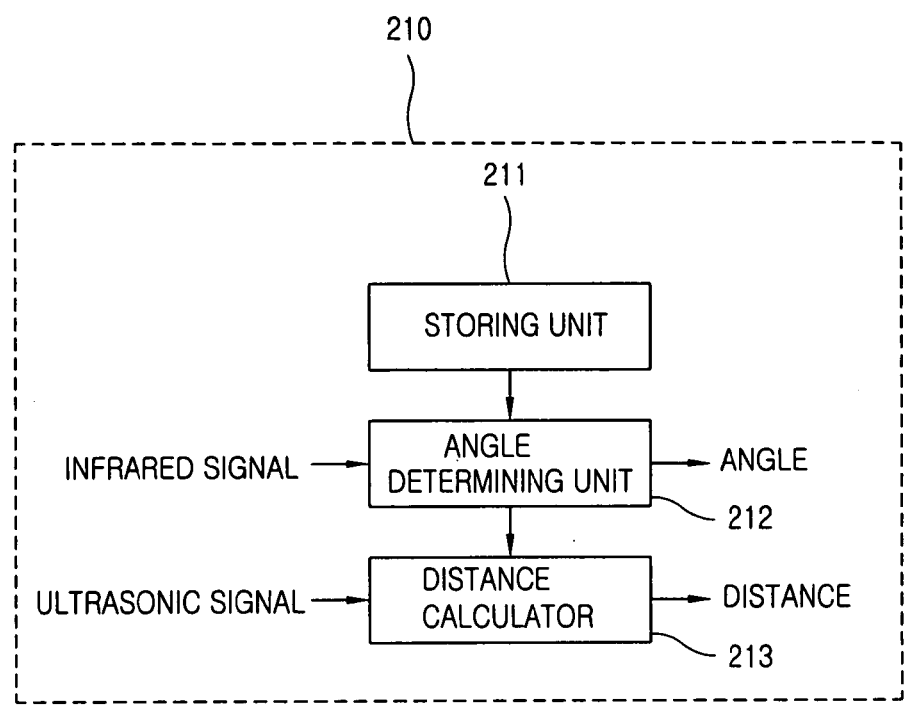
FIG. 2 is a block diagram showing a detailed construction of a position detector of FIG. 1.

FIG. 2 is a block diagram showing a detailed construction of a position detector of FIG. 1.

As shown in FIG. 2, the position detector 210 includes a storing unit 211 for previously storing specific frequencies (different frequencies) of infrared signals radiated from the infrared signal generator 101 of the charging unit 100; an angle determining unit 212 for comparing a specific frequency of an infrared signal radiated from the infrared signal generator 101 and the previously stored frequency values, searching a frequency value identical to the specific frequency, and detecting an angle corresponding to the searched frequency value to determine an angle between the mobile robot 200 and the charging unit 100; and a distance calculator 213 for calculating a distance between the mobile robot 200 and the charging unit 100 by multiplying a sound velocity to a difference between the time taken for the infrared signal to be received by the mobile robot 200 after being radiated from the infrared signal generator 101 and the time taken for the ultrasonic signal to be received by the mobile robot 200 after being oscillated from the ultrasonic wave oscillator 102.

The operation of the apparatus for detecting a position of the mobile robot in accordance with the present invention will now be described in detail with reference to FIG. 3.

FIG. 3 is a flow chart of a method for detecting a position of the mobile robot in accordance with the preferred embodiment of the present invention.

First, the infrared signal generator 101 installed in the charging unit 100 rotates repeatedly at a predetermined angle region at a certain speed (step S11) and radiates an infrared signal having a specific frequency whenever it rotates by 1 degree. Herein, preferably, the infrared signal generator 101 rotates at a region of 180 degrees or 360 degrees at a certain speed. In addition, preferably, the infrared signal having the specific frequency is radiated whenever the infrared signal generator 101 rotates by 1 degree. Accordingly, when the infrared signal generator 101 rotated by 180 degrees, because the infrared signal generator 101 radiates an infrared signal having its specific frequency, it generates 180 specific frequency values (step S12).

When the angle determining unit 212 installed in the mobile robot 200 receives the infrared signal generated from the infrared signal generator 101, it compares a specific frequency value of the received infrared signal to reference frequency values previously stored in the storing unit 211 and determines an angle between the mobile robot 200 and the charging unit 100.

For example, if the infrared signal generator 101 rotates by 1 degree, it can generate an infrared signal having a frequency value of 50 kHz. If the infrared is signal generator 101 rotates by 10 degrees, it can generate an infrared signal having a frequency value of 100 kHz. If the infrared signal generator 101 rotates by 40 degrees, it can generate an infrared signal having a frequency value of 300 kHz. If the infrared signal generator 101 rotates by 42 degrees, it can generate an infrared signal having a frequency value of 320 kHz. If the infrared signal generator 101 rotates by 70 degrees, it can generate an infrared signal having a frequency value of 500 kHz. If the infrared signal generator 101 rotates by 120 degrees, it can generate an infrared signal having a frequency value of 700 kHz. And the frequency values generated differently at each angle are stored in advance in the storing unit 211.

Accordingly, when the specific frequency value of an infrared signal received from the infrared signal generator 101 is 320 kHz, the angle determining unit 212 searches the reference frequency values previously stored in the storing unit for a frequency value identical to the frequency value 320 kHz, and detects an angle (42 degrees) corresponding to the searched frequency value (320 kHz), thereby easily recognizing the angle between the mobile robot and the charging unit.

If the charging unit 100 is fixedly attached at a wall surface of a living room of a house, it is preferred that the front direction of the infrared signal generator 101 installed and rotated at a certain portion of the charging unit 100 is set to be 90 degrees (step S13).

Thereafter, the ultrasonic wave oscillator 102 oscillates the ultrasonic signal whenever the infrared generator 101 rotates and reaches a predetermined angle. Namely, the ultrasonic wave oscillator 102 is preset to oscillate the ultrasonic signal when the infrared generator 100 rotates and reaches the predetermined angle. In this respect, preferably, the ultrasonic oscillator 102 oscillates the ultrasonic signal whenever the infrared generator 101 rotates and reaches 90 degrees.

The distance calculator 213 of the mobile robot 200 receives the ultrasonic signal oscillated from the ultrasonic wave oscillator 102, measures a time taken for the ultrasonic signal to be received after being oscillated, and calculating a distance between the mobile robot 200 and the ultrasonic wave oscillator 102 by multiplying a sound velocity to the measured time.

For instance, it is assumed that the infrared signal generator 101 rotates by 1 rpm (rotates by 360 degrees per 60 seconds), the angle between the mobile robot 200 and the infrared generator 101 is 42 degrees when the angle determining unit 212 receives an infrared signal, the ultrasonic signal is oscillated when the infrared signal generator 101 rotates and reaches 90 degrees, and a time taken for the ultrasonic signal to be received by the distance calculator 213 on the basis of a time at which the infrared signal has been received by the angle determining unit 212 is 8.1 seconds (T1) (In this connection, the infrared signal generator 101 rotates by 6 degrees per seconds). Then, a time (T2) taken for the infrared generator to rotate by 90 degrees, the predetermined angle, on the basis of the time at which the infrared signal has been received by the angle determining unit 212 is 8 seconds (90 degrees−42 degrees=48 degrees)/6 degrees=8 seconds). Therefore, the actual time taken for the ultrasonic signal to be received by the distance calculator 213 after being oscillated is 0.1 seconds (step S14).

Consequently, the distance between the mobile robot 200 and the ultrasonic wave oscillator 102 can be obtained by multiplying the sound velocity (340 m/sec) to the time (0.1 seconds) taken for receiving the ultrasonic signal after being oscillated (340 m/sec×0.1 sec. =34 m). Namely, the distance calculator 213 calculates an actual distance (S) between the mobile robot 200 and the ultrasonic wave oscillator 102 through equation (1) below:

$$S=340\ m/\sec\times(T1\text{-}T2) \qquad (1)$$

wherein T1 is the time taken for the ultrasonic signal to be received by the distance calculator 21 of the mobile robot 200 on the basis of the time at which the infrared signal has been received by the angle determining unit 212 of the mobile robot 200, and T2 is the time taken for the infrared generator 101 to rotate by 90 degrees, the predetermined angle, on the basis of the time at which the infrared signal has been received by the angle determining unit 212 of the mobile robot 200 (step S15).

Thus, when the position detector 210 installed in the mobile robot 200 receives the infrared signal generated from the infrared signal generator 10, it compares a specific frequency value of the received infrared signal with reference frequency values previously stored in the storing unit 211 to determine the angle between the mobile robot 200 and the charging unit 100, multiplies the sound velocity to the time taken for receiving the ultrasonic signal after being oscillated to calculate a distance between the mobile robot 200 and the ultrasonic oscillator 102, and accurately and precisely detects a current position of the mobile robot 200 on the basis of the determined angle and the calculated distance value (step S16). For example, the mobile robot 200 is currently positioned in the direction of 42 degrees to and 34 m away from the charging unit 100.

Since the ultrasonic wave oscillator 102 is installed in the charging unit 100, the distance between the mobile robot 200 and the ultrasonic wave oscillator 102 and the distance between the mobile robot 200 and the charging unit 100 are similar.

As so far described, the method and apparatus for detecting a position of a mobile robot of the present invention have the following advantages.

Infrared signals having difference frequency values are generated at each angle, an angle between the mobile robot 200 and the infrared generator 100 generating the infrared signal is determined on the basis of a frequency value of the generated infrared signal, and then, the distance between the mobile robot 200 and the ultrasonic wave oscillator 102 oscillating the ultrasonic signal is calculated by multiplying the sound velocity to the time taken for receiving the ultrasonic signal after being oscillated, so that the position of the mobile robot 200 can be accurately and precisely detected.

For example, installation of the position detecting apparatus in accordance with the present invention would enable the robot cleaner to perform an accurate and precise cleaning operation on the basis of its accurately calculated position and previously stored map information and accurately move to the charging unit.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for detecting a position of a mobile robot, said method comprising:
    receiving at the mobile robot an infrared signal generated from an infrared generator according to a rotation angle of the rotated infrared generator;
    determining an angle between the mobile robot and the infrared generator based on a specific frequency value of the received infrared signal and previously stored frequency values;
    receiving an ultrasonic signal oscillated from an ultrasonic signal oscillator when the infrared generator reaches a predetermined angle;
    calculating a distance between the mobile robot and the ultrasonic wave oscillator by multiplying a sound velocity to a time taken for receiving the ultrasonic signal by the mobile robot after being oscillated; and
    detecting a position of the mobile robot based on the determined angle and the calculated distance.

2. The method of claim 1, wherein the received infrared signals have different frequency values.

3. The method of claim 1, wherein the infrared signal generated from the infrared generator has a different frequency value whenever a rotation angle of the infrared generator is changed.

4. The method of claim 1, wherein receiving the infrared signal comprises receiving infrared signals having different specific frequency values generated whenever the rotation angle of the infrared generator is changed.

5. The method of claim 1, wherein determining the angle comprises:
    comparing a specific frequency value of the infrared signal generated from the infrared generator with previously stored frequency values; and
    searching a frequency value identical to the specific frequency value from the comparison result, and detecting an angle corresponding to the searched frequency value.

6. The method of claim 1, wherein the predetermined value is 90 degrees.

7. The method of claim 1, wherein the infrared generator rotates by 180 degrees or 360 degrees.

8. The method of claim 1, wherein the distance (S) between the mobile robot and the ultrasonic wave oscillator is calculated by an equation of $S=340 \text{ m/sec} \times (T1-T2)$, and
    wherein T1 is a time (seconds) taken for the ultrasonic signal to be received by the mobile robot on the basis of a time at which the infrared signal has been received by the mobile robot, and T2 is a time taken for the infrared generator to rotate up to a predetermined angle on the basis of the time at which the infrared signal has been received by the mobile robot.

9. An apparatus for detecting a position of a mobile robot, comprising:
    an infrared signal generator installed in a charging unit and configured to charge a battery of the mobile robot, to rotate at a predetermined angle region at a predetermined rate, and to generate an infrared signal whenever the rotation angle is changed;
    an ultrasonic wave oscillator installed in the charging unit and configured to oscillate an ultrasonic signal when the infrared signal generator rotates and reaches a predetermined angle; and
    a position detector configured to detect an angle between the mobile robot and the infrared signal generator installed in the charging unit on the basis of a frequency value of the infrared signal radiated from the infrared signal generator and previously stored reference frequency values, and to calculate a distance between the mobile robot and the ultrasonic oscillator installed in the charging by multiplying a sound velocity to the ultrasonic signal oscillated from the ultrasonic wave oscillator.

10. The apparatus of claim 9, wherein the position detector comprises:
    a storing unit configured to store the previous reference frequency values;
    an angle determining unit configured to compare a specific frequency value of the infrared signal radiated from the infrared signal generator and the previously stored frequency values, to search a frequency value identical to a specific frequency value from the comparison result, and to detect an angle corresponding to the searched frequency value to determine an angle between the mobile robot and the charging unit; and
    a distance calculator configured to calculate a distance between the mobile robot and the charging unit by multiplying a sound velocity to a difference value between a time taken for the infrared signal to be received by the mobile robot after being radiated from the infrared signal generator and a time taken for the ultrasonic signal to be received by the mobile robot after being oscillated from the ultrasonic wave oscillator.

11. The apparatus of claim 9, wherein the infrared generator generates different frequency values whenever the rotation angle is changed.

12. The apparatus of claim 9, wherein the predetermined angle is 90 degrees.

13. The apparatus of claim 9, wherein the infrared generator repeatedly rotates by 180 degrees and 360 degrees.

14. The apparatus of claim 10, wherein the distance calculator calculates the distance by equation of $S=340 \times (T1-T2)$, and
    wherein 'S' is the distance between the mobile robot and the charging unit, T1 is a time taken for the ultrasonic signal to be received by the mobile robot on the basis of a time at which the infrared signal has been received by the mobile robot, and T2 is a time taken for the infrared generator to rotate up to a predetermined angle on the basis of a time at which the infrared signal has been received by the mobile robot.

15. A charging device for charging a battery of a mobile robot, the charging device comprising:

an infrared signal generator configured to rotate at a predetermined angle region at a predetermined speed and to generate infrared signals having different frequency signal values whenever the rotation angle is changed; and an ultrasonic wave oscillator configured to oscillate an ultrasonic signal when the infrared signal generator rotates and reaches the predetermined angle.

16. A mobile robot moving on the basis of previously stored map information, said mobile robot comprising:

an angle determining unit configured to compare a specific frequency value of an infrared signal generated from an infrared generator according to a rotation angle of the rotated infrared generator and previously stored frequency values, to search a frequency value identical to the specific frequency value, and to determine an angle between the mobile robot and the infrared generator by detecting an angle corresponding to the searched frequency value; and a distance calculator configured to calculate a distance between the mobile robot and the charging unit by multiplying a sound velocity to a difference value between a time taken for the infrared signal to be received by the mobile robot after being radiated from the infrared signal generator and a time taken for the ultrasonic signal to be received by the mobile robot after being oscillated from the ultrasonic wave oscillator.

17. An apparatus for detecting a position of a mobile robot, the apparatus comprising:

a receiving unit configured to receive an infrared signal generated from an infrared generator according to a rotation angle of the rotated infrared generator;

a determining unit configured to determine an angle between the mobile robot and the infrared generator on the basis of a specific frequency value of the received infrared signal and previously stored frequency values;

a receiving unit configured to receive an ultrasonic signal oscillated from an ultrasonic signal oscillator when the infrared generator reaches a predetermined angle;

a calculating unit configured to calculate a distance between the mobile robot and the ultrasonic oscillator by multiplying a sound velocity to a time taken for the ultrasonic signal to be received by the mobile robot after being oscillated; and a detecting unit configured to detect a position of the mobile robot on the basis of the determined angle and the calculated distance.

* * * * *